US008029734B2

(12) United States Patent  (10) Patent No.: US 8,029,734 B2
Dai et al.  (45) Date of Patent: Oct. 4, 2011

(54) NONCOVALENT SIDEWALL FUNCTIONALIZATION OF CARBON NANOTUBES

(75) Inventors: Hongjie Dai, Sunnyvale, CA (US); Robert J. Chen, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1252 days.

(21) Appl. No.: 10/473,101

(22) PCT Filed: Mar. 29, 2002

(86) PCT No.: PCT/US02/21626
§ 371 (c)(1),
(2), (4) Date: Sep. 29, 2003

(87) PCT Pub. No.: WO02/095099
PCT Pub. Date: Nov. 28, 2002

(65) Prior Publication Data
US 2005/0100960 A1 May 12, 2005

Related U.S. Application Data

(60) Provisional application No. 60/280,605, filed on Mar. 29, 2001.

(51) Int. Cl.
*G01N 27/00* (2006.01)
*C12N 11/14* (2006.01)
(52) U.S. Cl. .......................................... 422/98; 435/176
(58) Field of Classification Search ................. 422/56, 422/58, 98; 435/176
See application file for complete search history.

(56) References Cited

U.S. PATENT DOCUMENTS

| 5,866,434 | A | * | 2/1999 | Massey et al. ................. 436/526 |
| 6,159,742 | A | | 12/2000 | Lieber et al. |
| 6,656,712 | B1 | * | 12/2003 | Balavoine et al. ............. 435/176 |
| 7,048,999 | B2 | * | 5/2006 | Smalley et al. ................ 428/367 |
| 2002/0102617 | A1 | * | 8/2002 | MacBeath et al. ............. 435/7.9 |
| 2002/0117659 | A1 | * | 8/2002 | Lieber et al. ..................... 257/14 |
| 2002/0172767 | A1 | * | 11/2002 | Grigorian et al. ......... 427/255.28 |
| 2005/0069947 | A1 | * | 3/2005 | Erlanger et al. ............... 435/7.1 |

OTHER PUBLICATIONS

Liu et al., Controlled deposition of individual single-walled carbon nanotubes on chemically functionalized templates, 1999, Chemical Physics Letters, 303, 125-129.*
Jaegfeldt et al., Electrochemical stability of catechols with a pyrene side chain strongly adsorbed on graphite electrodes for catalytic oxidation of dihydronicotinamide adenine dinucleotide, 1983, ACS Publications, vol. 105, p. 1805-1814.*
Soh et al., Integrated nanotube circuits: Controlled growth and ohmic contacting of single-walled carbon nanotubes, Aug. 2, 1999, American Institute of Physics, vol. 75, No. 5, p. 627-629.*
M. Meyyappan, Carbon Nanotubes: Science and Applications, 2005, CRC Press, p. 3.*

(Continued)

*Primary Examiner* — Lore Jarrett
(74) *Attorney, Agent, or Firm* — Crawford Maunu PLLC

(57) ABSTRACT

Carbon nanotubes are functionalized in a broadly applicable manner. According to an example embodiment of the present invention, single-wall carbon nanotubes (SWNTs) are non-covalently functionalized. The functionalized SWNTs are highly versatile, being useful for a variety of implementations, including for the immobilization of molecules, for circuit arrangements, molecular electronics and for molecular sensors. In addition, stable suspensions of functionalized SWNTs in solutions can be achieved, as well as the self-assembly of nanotubes with unperturbed $sp^2$ structures and thus their electronic characteristics.

27 Claims, 4 Drawing Sheets

OTHER PUBLICATIONS

Wise et al., Stable dispersion of single wall carbon nanotubes in polyimide: the role of noncovalent interactions, 2004, Chemical Physics Letters, p. 207-211.*

Li et al., Stucture-Dependent Electrical Properties of Carbon Nanotube Fibers, 2007, Advanced Materials, p. 3358-3363.*

Robert J. Chen, Hongjie Dai et al. "Noncovalent Sidewall Functionalization of Single-Walled Carbon Nanotubes for Protein Immobilization." Journal of the American Chemical Society. vol. 123, pp. 3838-3839 (Apr. 18, 2001).

Moonsub Shim, Hongjie Dai et al. "Functionalization of Carbon Nanotubes for Biocompatability and Biomolecular Recognition." NanoLetters, vol. 2, No. 4, pp. 285-288 (2002).

* cited by examiner

US 8,029,734 B2

NONCOVALENT SIDEWALL FUNCTIONALIZATION OF CARBON NANOTUBES

RELATED PATENT DOCUMENTS

This is the national stage filing under 35 U.S.C. §371 of International Application No. PCT/US02/21626 filed on Mar. 29, 2002, which claims benefit of U.S. Provisional Patent Application Ser. No. 60/280,605, filed on Mar. 29, 2001 and entitled "Noncovalent Sidewall Functionalization of Single-Walled Carbon Nanotubes and Controlled Protein Immobilization," to which priority is claimed under 35 U.S.C. §120 for common subject matter. This patent document also relates to U.S. patent application Ser. No. 09/574,393, filed on May 19, 2000 and entitled "Carbon Nanotube Devices," which is a divisional/continuation-in-part of U.S. patent application Ser. No. 09/133,948, filed on Aug. 14, 1998 and entitled "Carbon Nanotube Structures Made Using Catalyst Islands," and which claims priority to U.S. Provisional Application Ser. No. 60/171,200, filed on Dec. 15, 1999, all of which are fully incorporated herein by reference.

FEDERALLY SPONSORED RESEARCH OR DEVELOPMENT

Various aspect of this invention were made with support of the U.S. Government under grant number ECS 9871947 from the National Science Foundation (NSF), and the U.S. Government has certain rights therein.

FIELD OF THE INVENTION

The present invention relates generally to carbon nanotubes and more particularly to functionalization of carbon nanotubes and related applications.

BACKGROUND

Carbon nanotubes exhibit interesting and useful electrical properties, and may be utilized for a variety of devices. Single-walled carbon nanotubes (SWNTs), having single-molecule-thick walls, have been found to be particularly useful in a variety of implementations, including integrated molecular electronic devices and chemical sensors. These devices may be implemented, for example, in chemical and biological species detection and identification, microelectronics circuitry, medical devices, environmental monitoring, medical/clinical diagnosis and biotechnology for gene mapping and drug discovery. For general information regarding carbon nanotubes, and for specific information regarding SWNTs and its applications, reference may be made generally to the above-mentioned patent documents, and also to: "Carbon Nanotubes: Synthesis, Structure, Properties and Applications," M. S. Dresselhaus, G. Dresselhaus and Ph. Avouris (Eds.), Springer-Verlag Berlin Heidelberg, New York, 2001; and "T. Single-shell Carbon Nanotubes of 1-nm Diameter," Iijima, S. & Ichihashi, Nature 363, 603-605 (1993).

In these and other carbon nanotube implementations, nanotube devices exhibiting both high functionality and high flexibility are desirable. For instance, in electrical applications, the ability to manipulate electrical characteristics of a device to target the device's electrical behavior to a particular implementation increases the device's functionality and flexibility. Similarly, in chemical sensors, the ability to tailor a sensor for sensing a particular molecular species is also advantageous. In previous carbon nanotube implementations, however, achieving such high functionality and flexibility has been challenging.

SUMMARY

The present invention is directed to the above-mentioned challenges and applications and others that relate to carbon nanotube devices and their implementation. The present invention is exemplified in a number of implementations and applications, some of which are summarized below.

According to an example embodiment, the present invention is directed to a carbon nanotube device having a functionalized carbon nanotube sidewall, with molecules noncovalently bonded to the sidewall.

According to another example embodiment, the present invention involves functionalizing a single-walled carbon nanotube (SWNT) by noncovalently bonding a first type of molecule to the SWNT sidewall, the noncovalently-bonded molecules being irreversibly adsorbed onto the sidewall of the SWNT. In this manner, the functionalized SWNT can be used to immobilize another molecule, such as a protein, various biological substances, polymerizable molecules and inorganic nanoparticles. With this other molecule being so immobilized on the functionalized SWNT, electrical responses of the SWNT can be used to characterize the immobilized molecule.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
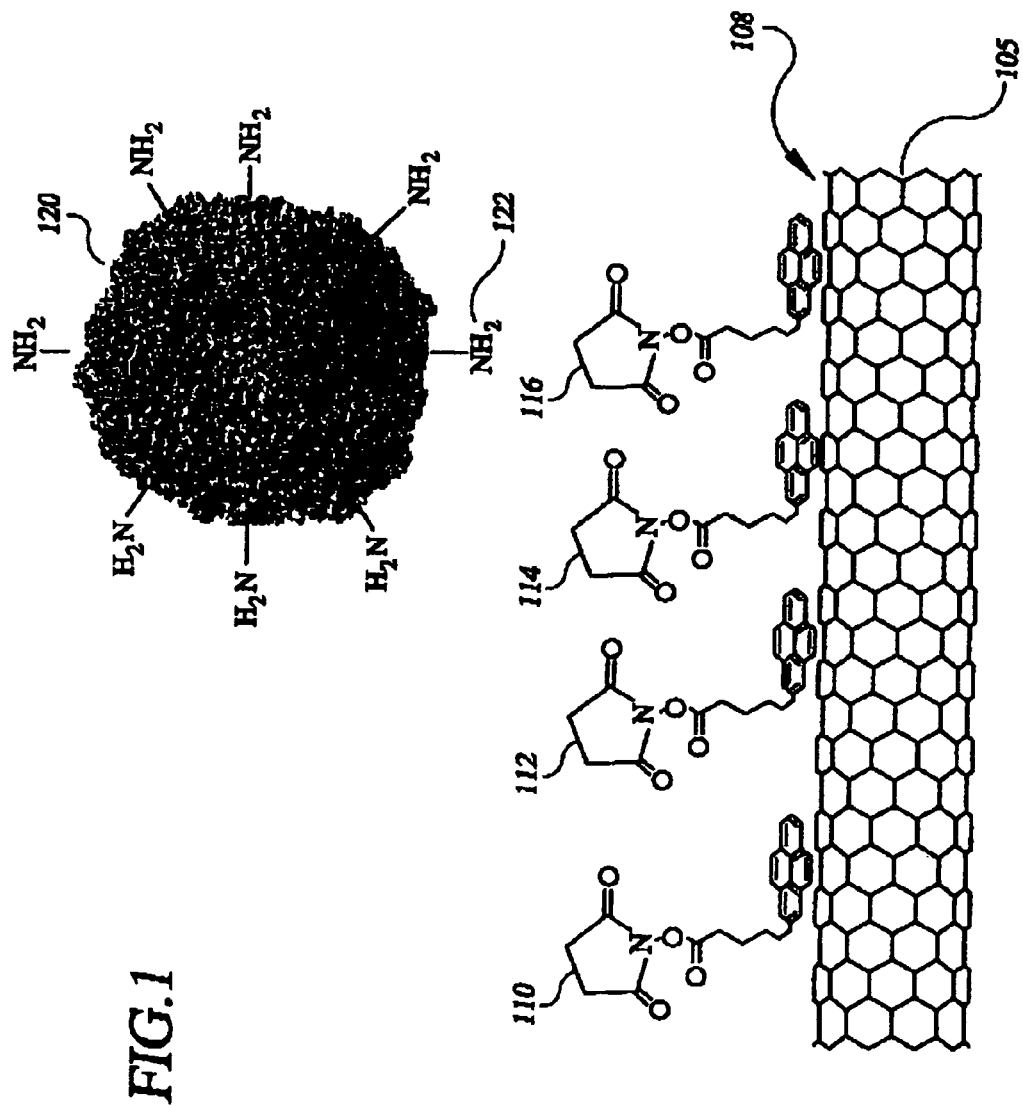
FIG. 1 is a carbon nanotube having molecules noncovalently bonded thereto, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of devices, and the invention has been found to be advantageous for functionalizing carbon nanotubes in a manner that preserves their general electrical characteristics. While the present invention is not necessarily limited to such applications, various aspects of the invention may be appreciated through a discussion of various examples using this context.

According to an example embodiment of the present invention, a carbon nanotube is functionalized by noncovalently bonding molecules to a sidewall of the carbon nanotube, such as a SWNT. Such noncovalent SWNT sidewall functionalization preserves the $sp^2$ (electron spin) nanotube structure and thus preserves electronic characteristics of the SWNT. In this regard, the present invention is particularly useful for a variety of nanotube implementations, including soluble nanotubes, nanotubes self-assembled on surfaces, nanotubes for immobilization of molecules, nanotubes for chemical sensors and nanotubes for molecular electronics.

In a more particular example embodiment of the present invention, the noncovalent sidewall functionalization is used for self-assembly of nanotubes with unperturbed $sp^2$ (electron spin) structures and electronic properties.

Consistent with the present invention, FIG. 1 shows a SWNT 105 having a plurality of noncovalently-bonded molecules 110, 112, 114 and 116, according to another example embodiment of the present invention. The noncovalently-bonded molecules are configured and arranged for bonding to additional molecules, such as biomolecules such as antibodies, antigens and DNA, polymerizable molecules, inorganic particles and proteins (e.g., metallothionein, streptavidin, ferritin, biotinyl-3,6-dioxaoctanediamine (biotin-PEO-amine)), and various inorganic molecules that are electrically semiconductive and therefore have interesting and useful electrical properties.

In one example implementation, molecule 116 is functionalized with a bifunctional molecule from a succinimidyl ester group that is highly reactive to nucleophilic substitution by primary and secondary amines that exist in abundance on the surface of most proteins. More specifically, the molecule 116 can be 1-pyrenebutanoic acid, succinimidyl ester (hereinafter referred to as "the first example combination"), available from Molecular Probes, Inc., USA, and is irreversibly adsorbed onto a hydrophobic surface 108 of the SWNT 105. The bifunctional molecule 116, from the pyrenyl group, is highly aromatic in nature and strongly interacts with the sidewalls of the SWNT, which makes the molecule highly stable against desorption in aqueous solutions. Generally, molecules are irreversibly adsorbed onto the sidewall of the SWNT by one or more of various non-covalent forces such as van der Waals and hydrophobic interactions, and π-stacking. Due to the highly-aromatic characteristics of the pyrenyl group, as with the basal plane of graphite, the strong interaction with the SWNT sidewalls is via π-stacking.

A protein molecule 120 is bonded to the bifunctional molecule 116 using nucleophilic substitution of N-hydroxysuccinimide by an amine group ($NH_2$) 122 on the protein, resulting in the formation of an amide bond. This technique enables the immobilization of a wide range of biomolecules on the sidewalls of SWNTs with high specificity and efficiency.

Figure 2:
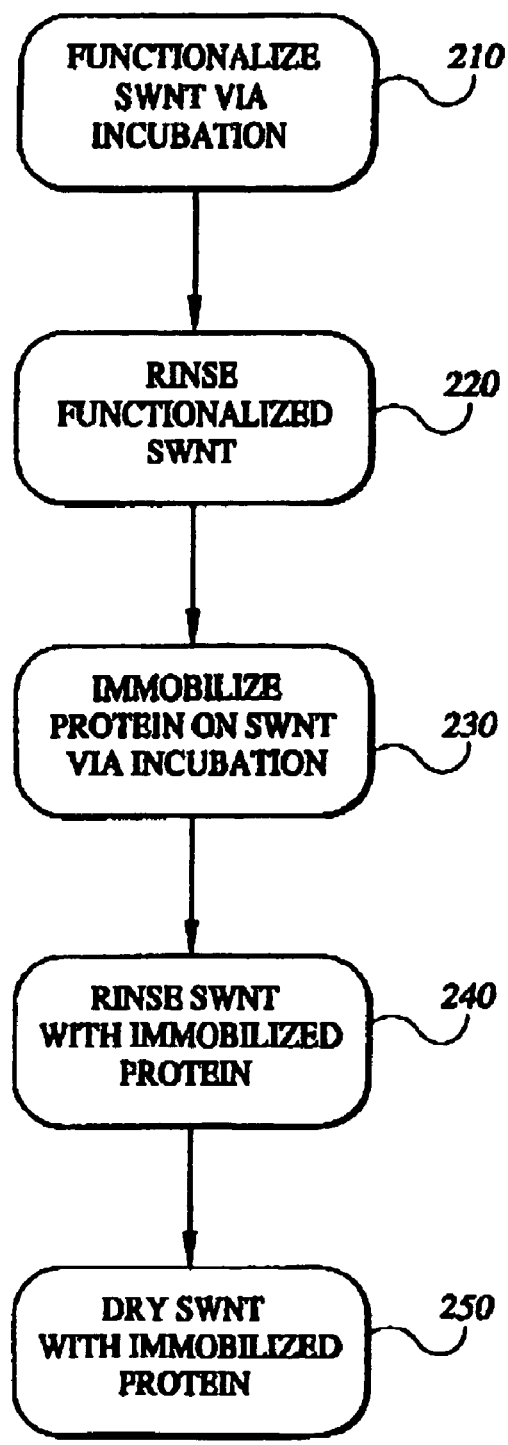
FIG. 2 is a flow diagram for noncovalent sidewall functionalization and subsequent protein immobilization of a SWNT, according to another example embodiment of the present invention.

FIG. 2 is a flow diagram for immobilizing a protein with a SWNT, according to another example embodiment of the present invention. At block 210, a SWNT is incubated in a solution to noncovalently bond a bifunctional molecule thereto, thus functionalizing the SWNT (e.g., similar to SWNT 105 of FIG. 1). The functionalization is achieved using one or more of a variety of incubation solutions, such as an organic solvent dimethylformamide (DMF) or methanol, with a functionalizing reagent therein. For instance, the functionalization of the SWNT 105 with molecule 116 in FIG. 1 can be achieved via incubation in a 1-pyrenebutanoic acid, succinimidyl ester solution (about 6 mM of the first example combination in DMF or about 1 mM in methanol) for 1 hour at room temperature. The functionalized SWNT is then rinsed at block 220 using, for example, pure DMF or methanol to wash away excess reagent.

For protein immobilization, the functionalized SWNT is incubated in an aqueous solution of protein at block 230, subsequently rinsed at block 240 and dried at block 250. Referring again to the SWNT 105 of FIG. 1, the protein 120 immobilization can be achieved via incubation at block 230 for about 18 hours at room temperature. After the protein immobilization, the SWNT 105 is rinsed thoroughly in pure water for about 6 hours, and then dried.

In another example embodiment of the present invention, biotin-PEO-amine (available from Pierce Chemical, USA) is immobilized onto a SWNT at block 230. The incubation is carried out using an aqueous solution of biotin-PEO-amine (about 20 mg/mL) for about 18 hours to covalently link the biotin group via an amide-forming reaction mechanism, similar to that discussed above. The SWNT is then exposed to a solution of streptavidin-Au conjugate to achieve streptavidin-biotin coupling, and subsequently rinsed and dried at blocks 240 and 250, respectively.

In still another example embodiment of the present invention, SWNTs formed using laser ablation are deposited onto a $SiO_2$ substrate from suspension in 1,2-dichloroethane (e.g., about 1 mg of SWNT/10 mL of solvent). The substrate is then incubated in the first example combination (6 mM, in DMF) for 1 hour, rinsed thoroughly in pure DMF, exposed to a dilute ferritin solution (e.g., about 10 μg/mL in a 15 μM NaCl solution) for about 18 hours, and then rinsed in pure water for about 3 hours. This approach is effective in providing bonding to the SWNT and not to the substrate.

In another implementation, a bundle of SWNTs is functionalized at block 210. The SWNT bundle is similarly used to immobilize a protein at block 230. Because of concave regions formed between neighboring individual SWNTs, proteins can be readily anchored (or immobilized) via noncovalent bonds with one or more SWNTs in the SWNT bundle.

Figure 3:
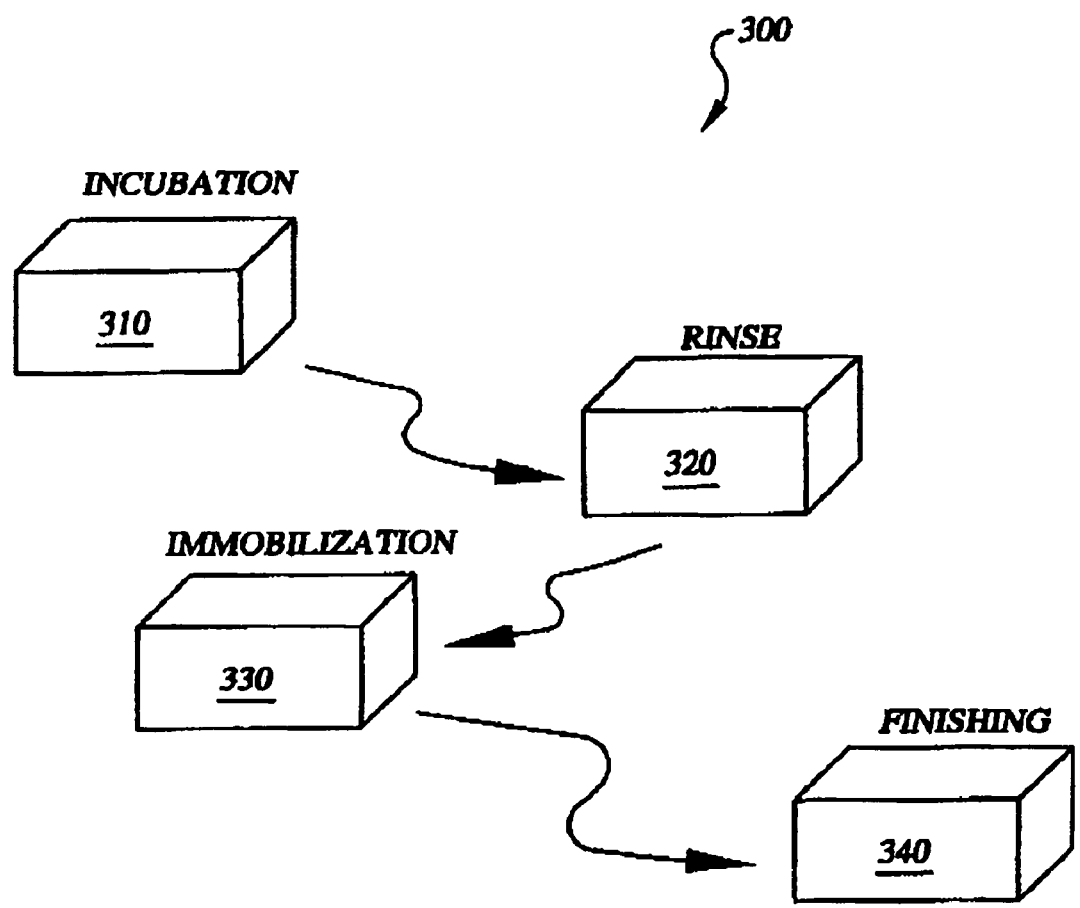
FIG. 3 is a system for functionalizing SWNTs and immobilizing molecules therewith, according to another example embodiment of the present invention.

The incubation and rinsing steps shown by way of example in FIG. 2 may be carried out using one or more of a variety of systems. FIG. 3 shows one such protein immobilization system 300, according to another example embodiment of the present invention. The system 300 includes four chambers 310, 320, 330 and 340, with each chamber being arranged to hold a plurality of SWNTs, such as an array of SWNTs formed on a grid of catalyst over a substrate. Incubation station 310 is arranged to hold an aqueous solvent with a reagent suspended therein, which noncovalently bonds to and functionalizes the SWNTs. After incubation in station 310, station 320 is arranged to rinse SWNTs using, for example, a solvent as discussed above. Station 330 also is arranged to hold an aqueous solution with molecules for immobilization using the functionalized SWNTs rinsed at station 320. Finally, station 340 is arranged for rinsing the functionalized SWNTs with immobilized molecules from station 330.

Figure 4:
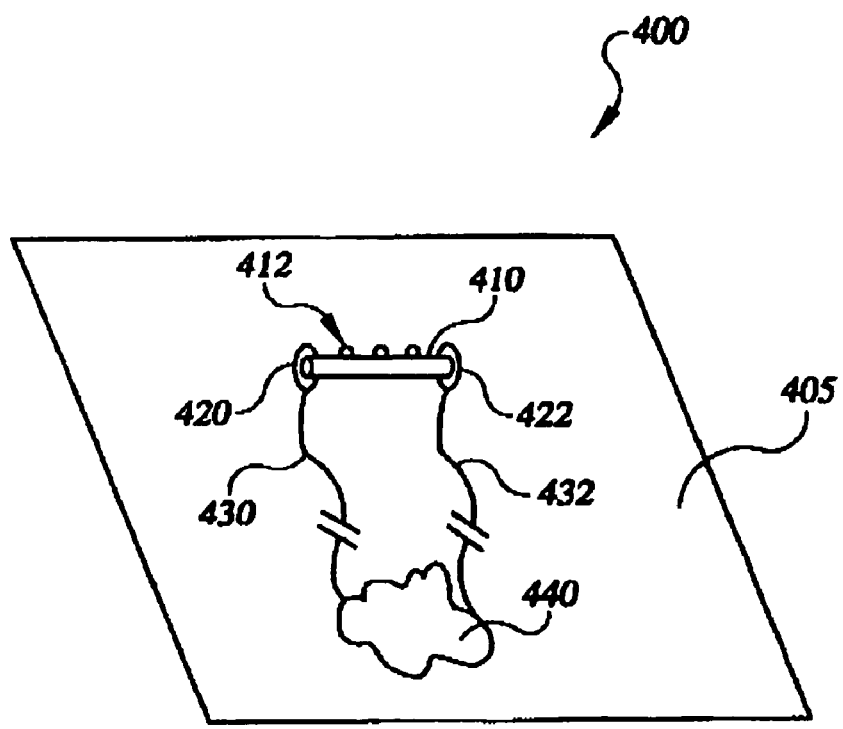
FIG. 4 is a circuit arrangement having a functionalized carbon nanotube, according to another example embodiment of the present invention.

FIG. 4 is a circuit arrangement 400 with a functionalized SWNT 410, according to another example embodiment of the present invention. The circuit arrangement includes circuitry 440 coupled via interconnects 430 and 432 to the SWNT 410 via electrodes 420 and 422. The electrodes are coupled to opposite ends of the SWNT 410, which is functionalized by molecules 412 that are noncovalently bonded thereto. The noncovalently bonded molecules 412 may, for example, be bonded to the SWNT using one or more of the implementations discussed herein. The functionalized SWNT 410 exhibits electrical characteristics that are a function of the noncovalently-bonded molecules 412. In this regard, the selection of the molecules 412 is tailored to a desired electrical characteristic for the circuit arrangement.

In a more particular example embodiment (not shown), the circuit arrangement 400 further includes immobilized molecules coupled to the noncovalently-bonded molecules 412 of the functionalized SWNT 410. In this implementation, the immobilized molecules alter an electrical characteristic of the SWNT, thus altering an electrical characteristic of the circuit arrangement 400. In one implementation, the type of immobilized molecule is selected for achieving the desired characteristics for the SWNT.

In another implementation, the circuit arrangement 400 is part of a sensor for detecting and identifying molecules via immobilization with the functionalized SWNT. The noncovalently-bonded molecules 412 have a composition that selectively immobilizes one or more types of molecules. The circuitry 440, coupled across the SWNT 410 at electrodes 420 and 422, detects an electrical characteristic, or a change thereof, for the SWNT 410 in response to the immobilized molecule. The detected electrical characteristic is used to identify the composition of the immobilized molecule (e.g., by comparing the detected characteristic to a known response of the SWNT to particular molecules). For general information regarding carbon nanotubes, and for specific information regarding sensing molecules with a carbon nanotube, reference may be made to U.S. Provisional Patent Application Ser. No. 60/335,306, filed on Nov. 1, 2001, and entitled "Integrated Nanotube Sensor."

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include modifying the carbon nanotubes for sensing one or more particular molecular species. Such modifications and changes do not depart from the true spirit and scope of the present invention. In addition, for general information regarding carbon nanotubes, and for specific information regarding carbon nanotube implementations that may be used in connection with the present invention, reference may be made to the Appendix which is part of the priority provisional patent document entitled "Noncovalent Sidewall Functionalization of Single-Walled Carbon Nanotubes and Controlled Protein Immobilization," as well as to the above-mentioned patent document entitled "Integrated Nanotube Sensor", which are fully incorporated herein by reference.

What is claimed is:

1. A single-walled carbon nanotube (SWNT) device, comprising:
a single-walled carbon nanotube having opposite end portions and including a functionalized sidewall having an $sp^2$ structure and molecules noncovalently bonded thereto to preserve the $sp^2$ structure of the carbon nanotube, the noncovalently bonded molecules extending away from and functionalizing the sidewall by altering the ability of the sidewall to interact with select molecules, the carbon nanotube being configured and arranged with an electronic circuit for conducting electricity between the opposite end portions for detecting an electrical characteristic of the carbon nanotube.

2. The carbon nanotube device of claim 1, wherein
the carbon nanotube is arranged over a surface on which the electronic circuit is formed, and
the noncovalently-bonded molecules are irreversibly adsorbed onto the sidewall of the SWNT and extend away from the carbon nanotube and the substrate, for interacting with other molecules introduced to the carbon nanotube and, in response to such interaction, to alter a detectable electrical characteristic of the carbon nanotube.

3. The carbon nanotube device of claim 2, wherein the noncovalently-bonded molecules are irreversibly adsorbed onto the sidewall of the SWNT by at least one of a plurality of non-covalent forces including: $\pi$-stacking, a van der Waals interaction, and a hydrophobic interaction.

4. The carbon nanotube device of claim 3, wherein the molecules comprise proteins.

5. The carbon nanotube device of claim 3, further including a protein immobilized on the sidewall of the SWNT.

6. The carbon nanotube device of claim 5, wherein the protein is immobilized on the sidewall of the SWNT via an amide bond.

7. The carbon nanotube device of claim 5, wherein the protein is immobilized on the sidewall of the SWNT via a nucleophilic substitution involving an amine group on the protein.

8. The carbon nanotube device of claim 5, wherein the protein is immobilized on the sidewall of the SWNT via a nucleophilic substitution involving an amine group on the protein to form an amide bond between the protein and the sidewall.

9. A device comprising:
a single-walled carbon nanotube (SWNT) having opposite end portions and including a functionalized sidewall having an $sp^2$ structure and molecules noncovalently bonded thereto to preserve the $sp^2$ structure of the carbon nanotube, the carbon nanotube being configured and arranged with an electronic circuit for conducting electricity between the opposite end portions for detecting an electrical characteristic of the carbon nanotube; and
circuitry electrically coupled to the SWNT and configured and arranged to detect an electrical response of the functionalized SWNT.

10. The device of claim 9, wherein the noncovalently-bonded molecules alter an electrical characteristic of the SWNT in response to interactions with other molecules.

11. The device of claim 9, wherein the noncovalently bonded molecule is from the pyrenyl group.

12. The device of claim 9, wherein the noncovalently-bonded molecules are irreversibly adsorbed onto the sidewall of the SWNT, and wherein the molecules comprise proteins.

13. The device of claim 9, wherein the noncovalently-bonded molecules are irreversibly adsorbed onto the sidewall of the SWNT, and wherein the molecules are biological molecules selected from a group consisting of: antibodies, antigens, and DNA.

14. The device of claim 9, wherein the noncovalently-bonded molecules are irreversibly adsorbed onto the sidewall of the SWNT, and wherein the molecules comprise polymerizable molecules.

15. The device of claim 9, wherein the noncovalently-bonded molecules are irreversibly adsorbed onto the sidewall of the SWNT, and wherein the molecules comprise an inorganic nanoparticle species.

16. The device of claim 9, wherein the noncovalently-bonded molecules are irreversibly adsorbed onto the sidewall of the SWNT, and wherein the molecules comprise inorganic molecules that are at least electrically semi-conductive.

17. The device of claim 9, wherein the noncovalently-bonded molecules are irreversibly adsorbed onto the sidewall of the SWNT by at least one of a plurality of non-covalent forces including t-stacking.

18. The device of claim 9, wherein the noncovalently-bonded molecules are irreversibly adsorbed onto the sidewall of the SWNT by at least one of a plurality of non-covalent forces including van der Waals interaction.

19. The device of claim 9, wherein the noncovalently-bonded molecules are irreversibly adsorbed onto the sidewall of the SWNT by at least one of a plurality of non-covalent forces including hydrophobic interaction.

20. The device of claim 9, wherein the noncovalently-bonded molecules are configured to interact with the SWNT to set a high, unperturbed $sp^2$ conductivity state of the SWNT, relative to an $sp^3$ conductivity state of the SWNT, for detecting the electrical characteristic.

21. A single-walled carbon nanotube (SWNT) device, comprising:
a carbon nanotube having opposite ends and including a functionalized sidewall having an $sp^2$ structure and molecules noncovalently bonded thereto and arranged to preserve the $sp^2$ structure of the carbon nanotube and at a sidewall portion of the carbon nanotube between the opposite ends.

22. The carbon nanotube device of claim 21, wherein the opposite ends are each free of molecules.

23. The carbon nanotube device of claim 21 wherein the molecules are at a sidewall portion of the carbon nanotube that is substantially spaced apart from both of the opposite ends.

24. The carbon nanotube device of claim 21, wherein the molecules extend in a direction that is substantially orthogonal to a surface of the sidewall extending between the opposite ends for interacting with other molecules introduced to the carbon nanotube and, in response to such interaction, to alter a detectable electrical characteristic of the carbon nanotube.

25. The device of claim 21, wherein the noncovalently-bonded molecules are configured to interact with the SWNT to set a high, unperturbed $sp^2$ conductivity state of the SWNT, relative to an $sp^3$ conductivity state of the SWNT.

26. An electronic sensor device comprising:
an array of electrode pairs;
for each electrode pair, a functionalized single-walled carbon nanotube (SWNT) having opposite ends coupled to the electrodes and including a functionalized sidewall and protein molecules noncovalently bonded thereto and configured and arranged to preserve an $sp^2$ structure of the carbon nanotube, the SWNT being configured and arranged for conducting electricity between the electrodes; and
a detector circuit electrically coupled to each of the electrode pairs for detecting an electrical response of the SWNT that couples the electrodes, and for using the electrical response to detect an interaction between the functionalized SWNT and an environment to which the SWNT is exposed.

27. The carbon nanotube device of claim 1, wherein the noncovalently-bonded molecules are configured to interact with the SWNT to set a high, unperturbed $sp^2$ conductivity state of the SWNT, relative to an $sp^3$ conductivity state of the SWNT, for detecting the electrical characteristic.

* * * * *

UNITED STATES PATENT AND TRADEMARK OFFICE
CERTIFICATE OF CORRECTION

| | | |
|---|---|---|
| PATENT NO. | : 8,029,734 B2 | Page 1 of 1 |
| APPLICATION NO. | : 10/473101 | |
| DATED | : October 4, 2011 | |
| INVENTOR(S) | : Dai et al. | |

It is certified that error appears in the above-identified patent and that said Letters Patent is hereby corrected as shown below:

In the Specification:

Col. 1, please replace lines 27-30 with:

--This invention was made with Government support under contract ECS 9871947 awarded by the National Science Foundation. The Government has certain rights in this invention.--

Signed and Sealed this
Third Day of April, 2012

David J. Kappos
*Director of the United States Patent and Trademark Office*